US008266528B1

(12) United States Patent
Hayes

(10) Patent No.: US 8,266,528 B1
(45) Date of Patent: Sep. 11, 2012

(54) SPELLING SUGGESTIONS BASED ON AN INPUT SEQUENCE INCLUDING ACCIDENTAL "DELETE"

(75) Inventor: Barry Hayes, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 92 days.

(21) Appl. No.: 12/822,747

(22) Filed: Jun. 24, 2010

(51) Int. Cl.
*G06F 17/21* (2006.01)
(52) U.S. Cl. .................. 715/256; 715/255; 715/257
(58) Field of Classification Search .................. 715/255, 715/256, 257
See application file for complete search history.

(56) References Cited

U.S. PATENT DOCUMENTS

| | | | |
|---|---|---|---|
| 6,047,300 A | 4/2000 | Walfish et al. | |
| 6,377,965 B1 * | 4/2002 | Hachamovitch et al. | 715/203 |
| 6,564,213 B1 * | 5/2003 | Ortega et al. | 1/1 |
| 2003/0017844 A1 * | 1/2003 | Yu | 455/556 |
| 2006/0224586 A1 * | 10/2006 | Pickover et al. | 707/6 |
| 2006/0241944 A1 | 10/2006 | Potter et al. | |
| 2008/0266261 A1 | 10/2008 | Idzik | |
| 2008/0266267 A1 * | 10/2008 | Chang | 345/173 |
| 2010/0259561 A1 * | 10/2010 | Forutanpour et al. | 345/660 |

OTHER PUBLICATIONS

Kane et al., "TrueKeys: Identifying and Correcting Typing Errors for People with Motor Impairments," IUI'08, Jan. 13-16, 2008, Maspalomas, Gran Canaria, Spain, 4 pp.
Office Action from U.S. Appl. No. 13/249,788, dated Jan. 12, 2012, 12 pp.
Response to Office Action dated Jan. 12, 2012, from U.S. Appl. No. 13/249,788, filed Apr. 12 2012, 10 pp.

* cited by examiner

*Primary Examiner* — William Bashore
*Assistant Examiner* — Gregory A Distefano
(74) *Attorney, Agent, or Firm* — Shumaker & Sieffert, P.A.

(57) ABSTRACT

In general, this disclosure describes techniques for providing spelling suggestions in response to user input. One example method comprises receiving user input via a keyboard associated with a computing device, the input specifying a sequence of characters of a word the user wishes to enter into a text-based application of the computing device. The method further comprises generating suggestion words based on the sequence of characters and on an alternate sequence of characters, where the alternate sequence of characters is generated by replacing characters in the sequence of characters with alternate characters corresponding to keys proximately located on the keyboard to keys corresponding to characters in the sequence of characters. In one example, the sequence of characters includes non-letter characters such as a DELETE character, the method further including replacing the DELETE character with a letter corresponding to a key adjacent to the DELETE key on the keyboard.

15 Claims, 5 Drawing Sheets

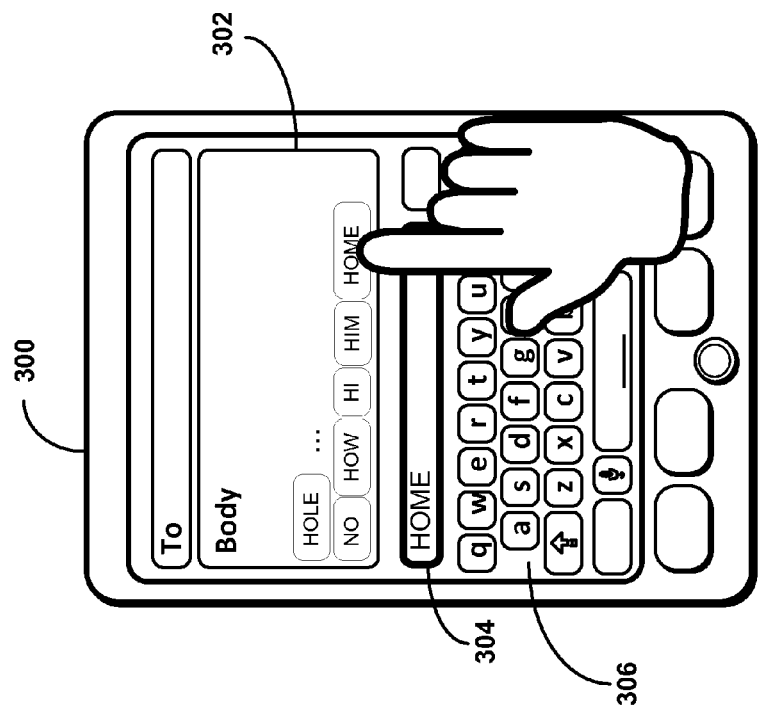
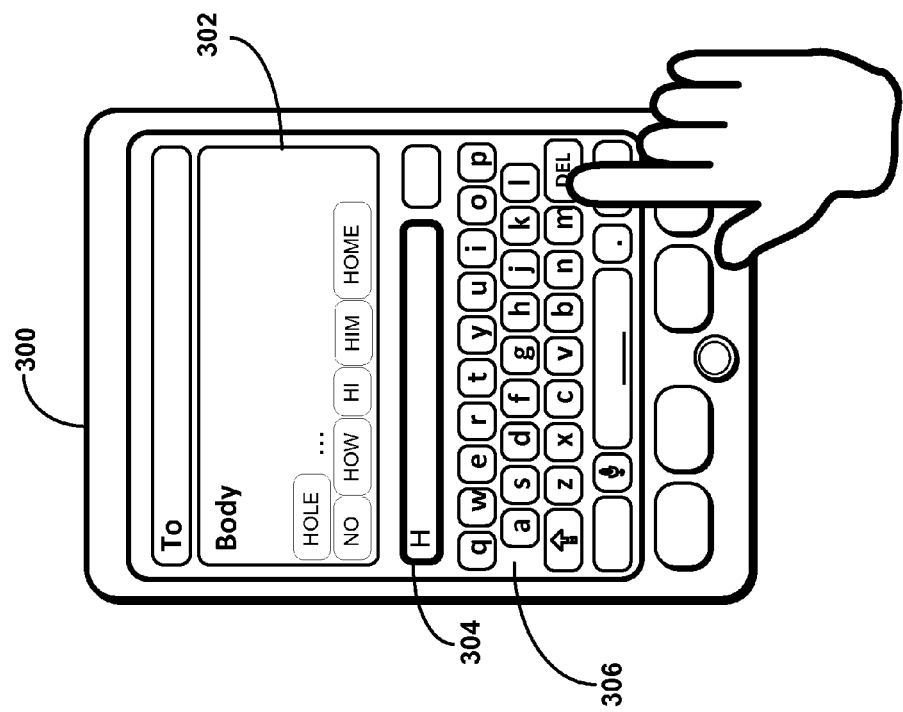
FIG. 3C
FIG. 3D

SPELLING SUGGESTIONS BASED ON AN INPUT SEQUENCE INCLUDING ACCIDENTAL "DELETE"

TECHNICAL FIELD

This disclosure relates to processing user input on a computing device.

BACKGROUND

Modern computing devices may include one or more input devices that allow users to enter text and other characters into the devices. A user may interact with one or more applications on a computing device to provide user input utilizing a user interface, e.g., a keyboard, mouse, touchpad, or the like.

In some cases, the computing device may utilize a keyboard user interface to receive input for text-based applications. Over the years, computing devices, especially mobile computing devices, have become significantly smaller, thus devoting a smaller area for user interfaces such as, for example, a keyboard.

Designers of modern computing devices have developed some data entry techniques that provide for auto-completion of entered text. Computing devices that support auto-completion provide a list of possible words based on a string of letters already keyed by the user. For example, the user may enter the letters "H O," and the auto-completion functionality may provide the user with a list of words that begin with the letters "H O." As the user types more characters, the auto-completion functionality may adjust the list of words based on the added letter, e.g., adding the letter "M" may adjust the list to words that begin with the letters "H O M." Some computing devices may employ auto-completion techniques that account for the possibility of an erroneous key stroke. In the example above, for the sequence "H O," the auto-completion functionality may provide the user with a list of words that begin with the letters "H O" in addition to words that begin with letters that are adjacent on the keyboard interface to the letters actually keyed by the user. In this example, other possible sequences may be "J O," "G O," "H I," "G I," "J I," and so forth.

SUMMARY

In general, this disclosure describes techniques for providing spelling suggestions in response to user input. For example, the user may input via a keyboard associated with a computing device a sequence of characters corresponding to a word the user wishes to enter into a text-based application on the computing device. These techniques attempt to generate alternate sequences of characters by replacing one or more characters in the sequence of characters with alternate characters corresponding to keyboard keys proximately located to keyboard keys associated with characters the alternate characters replace, and generate suggestion words based on the sequence of characters and the alternate sequences of characters. In one example, the sequence of characters includes a DELETE character, and the techniques may replace the DELETE character with a letter corresponding to a key adjacent to the DELETE key on the keyboard.

In one example, the disclosure is directed to a method comprising receiving, via a user interface of a computing device, a sequence of characters corresponding to user input provided via a keyboard of the user interface, wherein the keyboard includes a DELETE key, and wherein the sequence of characters includes a DELETE character, generating a first alternate sequence of characters from the sequence of characters by replacing the DELETE character in the sequence of characters with an alternate character that corresponds to an alternate key proximately located to the DELETE key on the keyboard, and generating one or more suggestion words beginning with the first alternate sequence of characters.

In another example, the disclosure is directed to a computer-readable storage medium encoded with instructions that, when executed, cause one or more processors to receive, via a user interface of a computing device, a sequence of characters corresponding to user input provided via a keyboard of the user interface, wherein the keyboard includes a DELETE key, and wherein the sequence of characters includes a DELETE character, generate a first alternate sequence of characters from the sequence of characters by replacing the DELETE character in the sequence of characters with an alternate character that corresponds to an alternate key proximately located to the DELETE key on the keyboard, and generate one or more suggestion words beginning with the first alternate sequence of characters.

In another example, the disclosure is directed to a computing device comprising one or more processors, a user interface, a user interface module operable by the one or more processors to receive, via the user interface of the computing device, a sequence of characters corresponding to user input provided via a keyboard of the user interface, wherein the keyboard includes a DELETE key, and wherein the sequence of characters includes a DELETE character, means for generating a first alternate sequence of characters from the sequence of characters by replacing the DELETE character in the sequence of characters with an alternate character that corresponds to an alternate key proximately located to the DELETE key on the keyboard, and means for generating one or more suggestion words beginning with the first alternate sequence of characters.

The techniques of this disclosure may provide one or more advantages. For example, certain techniques may allow a user to select an intended word from a list of generated suggestion words using fewer key strokes. The user may erroneously key a character by selecting a key that is proximately located to the intended key, and the generated suggestion words list may include suggestion words that include the character corresponding to the intended key. In one example, techniques of this disclosure may consider keying of non-letter characters an erroneous keying and generate suggestion words using characters associated with keys that are proximately located to the non-letter character key.

The details of one or more embodiments of the disclosure are set forth in the accompanying drawings and the description below. Other features, objects, and advantages of the disclosure will be apparent from the description and drawings, and from the claims.

BRIEF DESCRIPTION OF DRAWINGS

FIGS. 3A-3D are block diagrams illustrating example screens of a computing device as a user interacts with the device, in accordance with one or more techniques of the present disclosure.

DETAILED DESCRIPTION

In general, this disclosure describes techniques for providing spelling suggestions that correspond to a sequence of keyboard characters received via user input. For example, a user may enter a sequence of keyboard characters via a keyboard of a touch screen of a mobile computing device, where the sequence of characters may represent a prefix of a word that the user wishes to type in a text-based application, e.g., e-mail, text messaging, notes, and any other application that requires and/or accepts text input from the user. As the area a keyboard occupies on a computing device becomes smaller, the likelihood that a user may mistakenly select the wrong key increases. In text-based applications, this increases the chances of misspelling words by erroneously selecting a letter adjacent to the intended letter, e.g., selecting "m" instead of "n."

The techniques of this disclosure attempt to use a sequence of characters that the user selects as a prefix for suggestion words with alternate spellings and display the suggestion words via the user interface. Rather than waiting for the user to key in an entire word, the techniques may provide for adjusting the list of suggestion words as the user keys in additional characters. The techniques may also provide suggestion words based on an assumption that the user may have erroneously selected a character by pressing a neighboring character. In addition to generating alternate suggestion words based on an adjacent character to a keyed character, the techniques may generate alternate suggestion words based on assuming erroneous selection of non-character keys and replacing non-character key selections with characters adjacent to the selected non-character, e.g., selection of the DELETE key may be replaced with a letter adjacent to the DELETE key on the keyboard.

Figure 1:
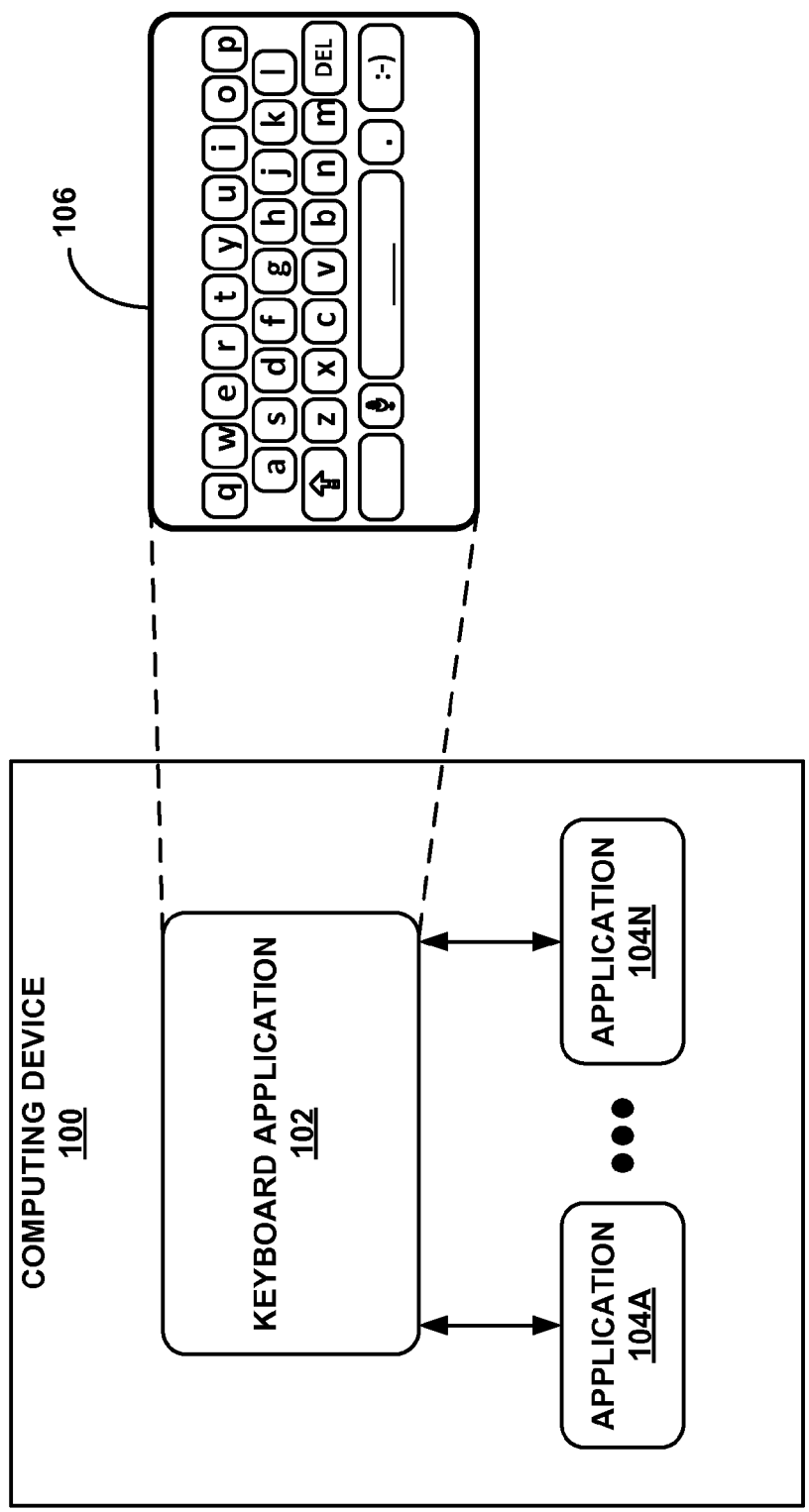
FIG. 1 is a block diagram illustrating an example computing device that may provide a keyboard application in accordance with one or more techniques of the present disclosure.

FIG. 1 is a block diagram illustrating an example computing device 100 that may provide a keyboard application 102 in accordance with one or more techniques of the present disclosure. Computing device 100 may comprise one or more stand-alone devices or may be part of a larger system. In some examples, computing device 100 may comprise a mobile device. For example, computing device 100 may comprise or be part of a wireless communication device (e.g., wireless mobile handset or device), a video telephone, a digital multimedia player, a personal digital assistant (PDA), a video game console, a laptop computer, or other devices. In some examples, computing device 100 may communicate with external, distinct devices via one or more networks (not shown), such as one or more wired or wireless networks, which may, in some cases, provide access to the Internet.

As shown in the example of FIG. 1, computing device 100 may include one or more applications 104A-104N and a keyboard application 102. Applications 104A-104N and keyboard application 102 may be executed by computing device 100 (e.g., by one or more processors included within computing device 100, as described in more detail with respect to FIG. 2). In some examples, keyboard application 102 may, during execution, control a physical keyboard associated with computing device 100, and comprising hard keys which a user may press to select characters. In other examples, keyboard application 102 may be a graphical keyboard application and may display to a user, during execution, a graphical keyboard on computing device 100 comprising soft keys which a user may touch (e.g., via user's fingers or an object, such as a stylus pen) to select characters.

Each of applications 104A-104N is operable on computing device 100 to perform one or more functions during execution. For example, one or more of applications 104A-104N may comprise a web or a communication application that interacts and/or exchanges data with a device that is external to computing device 100. A web application may, in some examples, be executable within a web browser that is operable on computing device 100. A communication application may, in some examples, be a messaging application, such as, short message service (SMS) application. Computing device 100 may, in various examples, download or otherwise obtain one or more of applications 104A-104N from an external server via one or more networks (not shown). For example, a web browser hosted by computing device 100 may download one or more of applications 104A-104N upon access of one or more web sites hosted by such as external server (e.g., web server). In some examples, at least a portion of applications 104A-104N may be text-based.

During execution, any of applications 104A-104N may implement, invoke, execute, or otherwise utilize keyboard application 102 as a mechanism to obtain user input. For example, if application 104A is an e-mail application, it may invoke execution of keyboard application 102 to allow a user to enter or type in e-mail text. In another example, if application 104N is a web browser application, it may invoke execution of keyboard application 102 to allow a user to enter Uniform Resource Identifier (URI) information or to provide user input during execution of one or more web applications.

Keyboard application 102 may, during execution, display or control a keyboard interface 106, which includes various different keys that may be selected by a user. In one example, keyboard interface 106 may be a physical keyboard associated with computing device 100. In another example, keyboard interface 106 may be a graphical keyboard displayed on computing device 100. In examples where computing device 100 includes a touch screen user interface, a user may touch or press on a key included within keyboard interface 106 to select that key for data or text entry.

Computing device 100 may receive, via a user interface (e.g., touch screen), user input specifying selection of one or more keys via keyboard interface 106. The user input may be via a contact with the user interface by pressing or touching one or more keys via keyboard interface 106 associated with one or more characters the user wishes to enter.

Computing device 100 may display, via the user interface, a sequence of characters corresponding to the one or more characters selected by the user. Computing device 100 may employ a processor to execute an algorithm that generates, based on the sequence of characters, a list of one or more suggestion words that based on the sequence of characters the user entered. In one example, as the user enters more characters, computing device 100 may regenerate the list of one or more suggestion words based on the new sequence of characters that includes the additional characters the user entered. The algorithm may generate an alternate list of suggestion words based on an alternate sequence of characters. The alternate sequence of characters may include alternate characters that replace characters in the sequence, where a key on keyboard 106, corresponding to an alternate character is proximately located to a key on keyboard 106 corresponding to the character in the sequence that the alternate character replaces. In other words, if the sequence of characters includes the letter "O," the alternate sequence of characters may include the letters "I," "P," "K," and "L," in place of the letter "O" for example, since those letters correspond to keys proximately located to the "O" key on keyboard 106.

In another example, the algorithm may utilize an alternate sequence of characters by replacing non-letter characters in the sequence of characters with letter characters associated with keys that are proximate located to the keys corresponding to the non-letter characters. For example, using the layout of FIG. 1, the key corresponding to DELETE on keyboard 106 is proximately located to the key corresponding to the letter "M." In one example, if a user enters a sequence of characters that includes a DELETE character, the algorithm may use one sequence of characters where DELETE is treated as a proper delete and another sequence of characters where DELETE is treated as an intended "M." In other words, if the user enters "H O<DELETE>," the algorithm may generate a list of suggestion words that begin with the sequences: "H O," "J O," "H I," "H O M," "H O L," "J O L," and so forth.

Computing device 100 may display the generated suggestion words on the screen, where the user may optionally select one of the suggestion words or continue to enter characters. In one example, the user may utilize his/her finger to interact with the touch screen to select suggestion words and/or keyboard keys (for example, where keyboard interface 106 comprises a graphical keyboard). In other examples, the user may utilize another instrument (e.g., stylus) to contact the touch screen in lieu of a finger to make selections. In some examples, computing device 100 may not include a touchscreen. In these examples, keyboard 106 may be a physical keyboard connected to computing device 100 or keyboard 106 may be displayed to a user on a monitor, and the user may utilize another input device as part of the user interface (e.g., a mouse or trackball) to interact with keyboard 106. The user may be able to perform similar actions to those described above without the use of a touch screen.

The techniques of this disclosure may provide one or more advantages. For example, certain techniques may allow a user to select an intended word from a list of generated suggestion words using fewer key strokes. The user may erroneously key a character by selecting a key that is proximately located to the intended key, and the generated suggestion words list may include suggestion words that include the character corresponding to the intended key. In one example, techniques of this disclosure may consider keying of DELETE an erroneous keying and generate suggestion words using characters associated with keys that are proximately located to the DELETE key. As a result, computing device 100 may display the word the user intended to enter without the user having to go back and reenter the intended sequence of letters after an erroneous keying of DELETE.

Figure 2:
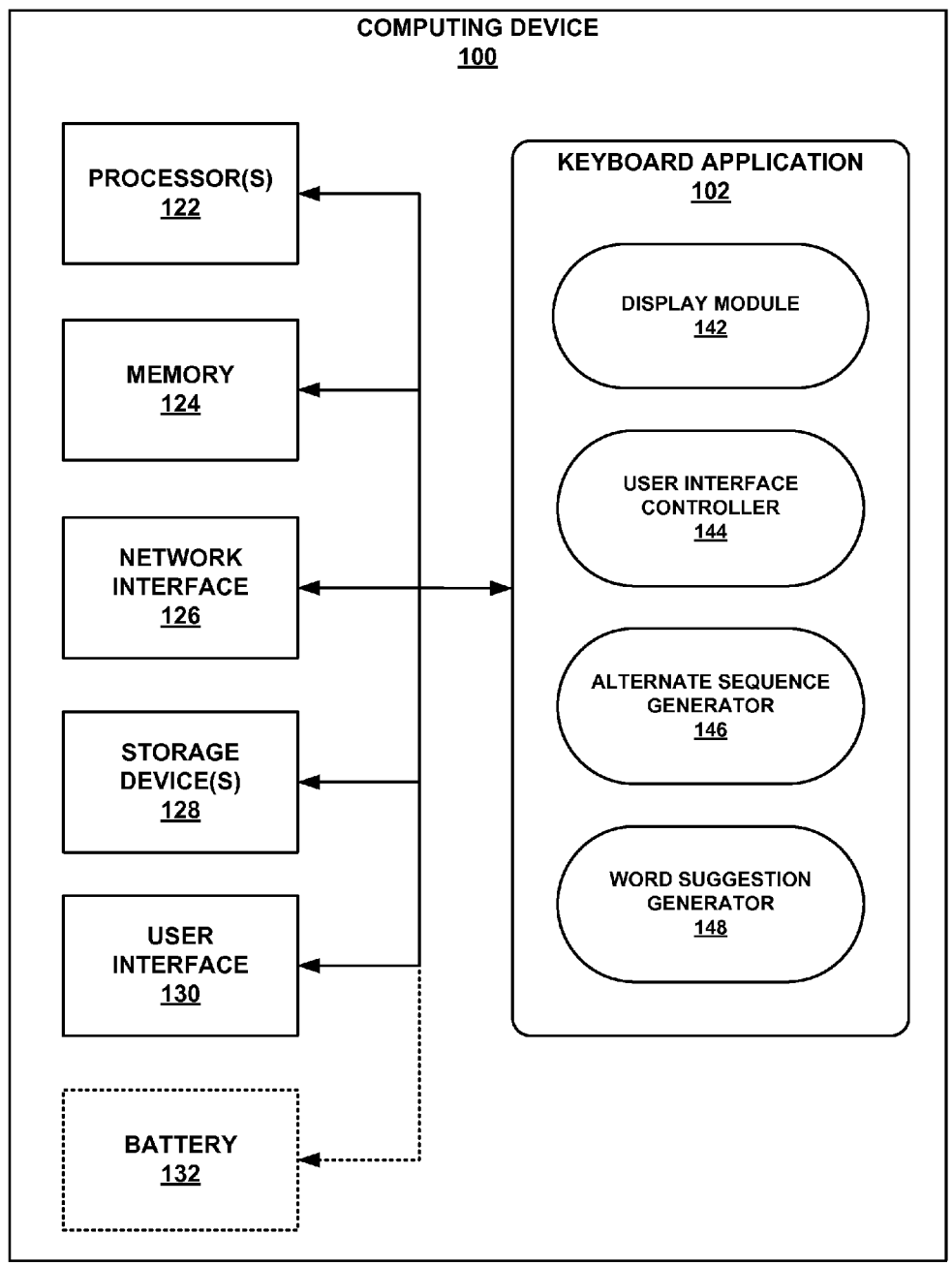
FIG. 2 is a block diagram illustrating further details of one example of the computing device shown in FIG. 1.

FIG. 2 is a block diagram illustrating further details of one example of the computing device 100 shown in FIG. 1. FIG. 2 illustrates only one particular example of computing device 100, and many other example embodiments of computing device 100 may be used in other instances. As shown in the example of FIG. 2, computing device 100 includes one or more processors 122, memory 124, a network interface 126, one or more storage devices 128, user interface 130, and an optional battery 132. For example, if computing device 100 comprises a mobile device, computing device 100 may include battery 132. Each of components 122, 124, 126, 128, 130, and 132 may be interconnected via one or more busses for inter-component communications. Processors 122 may be configured to implement functionality and/or process instructions for execution within computing device 100. Processors 122 may be capable of processing instructions stored in memory 124 or instructions stored on storage devices 128.

User interface 130 may include, for example, a monitor or other display device for presentation of visual information to a user of computing device 100. User interface 130 may further include one or more input devices to enable a user to input data, such as a manual keyboard, mouse, touchpad, trackpad, etc. In some example, user interface 130 may comprise a touchscreen, which may be used both to receive and process user input and also to display output information. User interface 130 may further include printers or other devices to output information. In various instances in the description contained herein, references made to user interface 130 may refer to portions of user interface 130 (e.g., keyboard, touch screen, mouse device) that provide user input functionality.

Memory 124 may be configured to store information within computing device 100 during operation. Memory 124 may, in some examples, be described as a computer-readable storage medium. In some examples, memory 124 is a temporary memory, meaning that a primary purpose of memory 124 is not long-term storage. Memory 124 may also be described as a volatile memory, meaning that memory 124 does not maintain stored contents when the computer is turned off. Examples of volatile memories include random access memories (RAM), dynamic random access memories (DRAM), static random access memories (SRAM), and other forms of volatile memories known in the art. In some examples, memory 124 may be used to store program instructions for execution by processors 122. Memory 124 may be used by software or applications running on computing device 100 (e.g., one or more of applications 104A-104N shown in FIG. 1) to temporarily store information during program execution.

Storage devices 128 may also include one or more computer-readable storage media. Storage devices 128 may be configured to store larger amounts of information than memory 124. Storage devices 128 may further be configured for long-term storage of information. In some examples, storage devices 128 may comprise non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Computing device 100 also includes network interface 126. Computing device 100 may utilize network interface 126 to communicate with external devices (e.g., one or more servers, web servers) via one or more networks.

Any applications implemented within or executed by computing device 100 (e.g., applications 104A-104N shown in FIG. 1) may be implemented or contained within, operable by, executed by, and/or be operatively coupled to processors 122, memory 124, network interface 126, storage devices 128, and/or user interface 130.

One example of keyboard application 102 is shown in FIG. 2. Keyboard application 102 may include a display module 142, a user interface controller 144, an alternate sequence generator 146, and a word suggestion generator 148. Keyboard application 102 may provide or display keyboard 106 shown in FIG. 1 (e.g., via user interface 130). Keyboard application 102 may be stored in memory 124 and/or storage devices 130, and may be operable by processors 122 to perform various tasks during execution.

In one example, during implementation or execution of keyboard application 102, display module 142 may be operable by processors 122 to display a graphical keyboard (e.g., keyboard 106) via user interface 130, the graphical keyboard including a plurality of keys. In another example, where computing device 100 comprises a physical keyboard, during implementation or execution of keyboard application 102, display module 142 may be operable by processors 122 to display characters corresponding to keys of keyboard 106 that the user selects. User interface controller 144 may be operable by processors 122 to receive, via user interface 130, user input specifying selection of one or more keys from the plurality of keys of keyboard 106, wherein the user input comprises a contact with user interface 130 (e.g., contact with a touchscreen, contact with a mouse device, contact with a physical keyboard), and wherein each of the selected keys is associated with a character.

Alternate sequence generator 146 may be operable by processors 122 to determine a plurality of alternate sequences of characters based on a sequence of characters the user enters via keyboard 106. User interface controller 144 may be operable to receive, via user interface 130 (e.g., keyboard 106), user input comprising one or more characters corresponding to one or more keys selected by the user. The one or more characters form a sequence of characters, which alternate sequence generator 146 utilizes to generate alternate sequences of characters by replacing characters in the sequence of characters with alternate characters. In one example, alternate sequence generator 146 may replace a character with an alternate character, where the keyboard key corresponding to the character is proximally located to the keyboard key corresponding to the alternate character. In one example, alternate sequence generator 146 may replace an instance of keying of DELETE with a character corresponding to a keyboard key that is proximally located to the DELETE key on keyboard 106.

Word suggestion generator 148 may be operable by processors 122 to generate a list of suggestion words based on one or more sequences of characters that alternate sequence generator 146 may provide. Word suggestion generator 148 may utilize a sequence of characters as a prefix of possible words that the user intends on typing. For example, if the sequence of characters is "H O," word suggestion generator 148 may generate the words "HOME," "HOPE," "HOLE," "HOUSE," and the like. Display module 142 may be operable to receive the list of suggestion words from word suggestion generator 148 for display to the user. The user may select one of the displayed suggestion words for entry into the application that computing device 100 may be running, where at least a portion of the application is text-based, and the user utilizes keyboard 106 to enter text into the application (e.g., e-mail, web browser, SMS application, and the like). Display module 142 may be operable to display keyboard 106 when computing device 100 utilizes a touch screen and a graphical keyboard.

As the user adds more characters via keyboard 106, alternate sequence generator 146 may modify the one or more sequences of characters. Word suggestion generator 148 may utilize the modified sequences of characters to generate new lists of suggestion words. In the example sequence above, the previous sequence of characters may be "H O," and the user may select DELETE next, and the new sequence of characters may be "H O<DELETE>." Alternate sequence generator 146 may generate the following sequences based on the characters selected by the user: "H O," "J O," "H I," "H O M," "H O L," "J O L," and so forth. Word suggestion generator 148 may generate the words "HOME," "HOLE," "JOLT," and the like. Display module 142 may receive the new suggestion words for display to the user.

Alternate sequence generator 146 may utilize a rule-based model to determine the alternate sequences of characters. The rule-based model may utilize a probabilistic model, which may take into account one or more factors. In one example, the probabilistic model may take into account the proximity of one key to a neighboring key based on the layout of the keyboard, and the general probability that a user may erroneously select a key in lieu of a neighboring key.

In another example, the probabilistic model may take into account the probability a key is erroneously selected instead of a neighboring key by the specific user. In this example, the pattern of the specific user's typing on the computing device may be tracked and historical data may be gathered and stored, for example, in memory 124 or storage devices 128. For example, historical data may indicate a probability that a selection of a certain character is erroneous. In one example, for a specific user, historical data may indicate that 50% of the times that the user selects "H," the selection is erroneous.

Additionally, historical data may indicate a probability associated with each proximally-located character as an alternate character. For example, the letter "H" is proximally located to "G," "J," "B," in the example keyboard 106 of FIG. 1. However, historical data for the specific user of computing device 100 may indicate that the specific user hits the "J" key when the intended key is "H" more frequently than for any of the other proximally-located keys. Therefore, when the specific user enters "H," alternate sequence generator 146 may indicate to word suggestion generator 148 the probability of erroneous keying associated with the letter "H" and that the probability that the user intended to enter "J" instead of "H" is much higher than the probability that the user intended to enter "G" or "B," instead of "H." As a result, word suggestion generator 148 may generate more suggestion words where the "H" is replaced with "J" as opposed to suggestion words where the "H" is replaced with "G" or "B."

In another example, historical data for the specific user of computing device 100 may indicate a high probability that when the specific erroneously selects DELETE, there is a higher probability that the intended key is "M" than "L." Therefore, in character sequences where the user selects DELETE, alternate sequence generator 146 may indicate that the DELETE character may be an erroneous selection and that the user likely intended to select "M" or "L," but that it is more likely "M" than "L." As s result, word suggestion generator 148 may generate more words where DELETE is replaced with "M" than words where DELETE is replaced with "L."

The rule-based model may also take into account other factors to determine the alternate sequences of characters. For example, the rule-based model may modify the rules for alternate character selection based on the layout of the keyboard. In one example, the layout of the keyboard may vary based on the amount of space available for the keyboard on the computing device. In another example, the layout of the keyboard may vary based on the language the user sets up as the language for the text-based application the user may be using. The rule-based model may also utilize a dictionary to determine possible options for character combinations. For example, if the user enters the sequence "K L," the user could have intended to select "J," "L," "M," "I," or "O" instead of "K" and "O," "P," or "K" instead of "L." Using the dictionary, alternate sequence generator 146 may utilize the rule-based model, which uses a dictionary to determine that, for example, there are no words that start with the letters "K P." Therefore, alternate sequence generator 146 does not generate the sequence "K P" as a possible alternate sequence based on which word suggestion generator 148 generates suggestion words.

FIGS. 3A-3D are block diagrams illustrating example screens of a computing device 300 as a user interacts with the device, in accordance with one or more techniques of the present disclosure. As shown in the example, a series of screens may be shown on a computing device 300, such as a mobile device (e.g., a smart phone). Computing device 300 may operate in the same manner as computing device 100 of FIGS. 1 and 2. Computing device 300 may include one or more user interface devices that allow a user to interact with the device. Example user interface devices may include, for example, a mouse, a touchpad, a track pad, a keyboard (e.g., keyboard 306), or the like. Computing device 300 may also include screen 302 via which computing device 300 displays to the user application-related options and screens. In one example, screen 302 may be a touch screen that allows interaction by user's touch via user's finger or a device (e.g., stylus pen).

FIGS. 3A-3D illustrate an example progression, according to the techniques described herein, as the user provides input to computing device 300 via a user interface device such as, for example, keyboard 306. In one example, keyboard 306 may be a physical keyboard comprising hard keys which a user may use to select characters by pressing the keys of keyboard 306. In another example, keyboard 306 may be displayed on touch screen 302 of computing device 300, where a user may use his/her fingers or a device (e.g., stylus pen) to interact with the touch screen and select character by touching the corresponding keys of keyboard 306. Keyboard 306 may have a standard keyboard layout or may have an alternate layout that depends on the amount of space available for the keyboard on computing device 300 and/or on screen 302. In the example of FIGS. 3A-3D, keyboard 306 includes letters of the English alphabet, and has a layout of a standard US keyboard, also known as QWERTY keyboard. Keyboard 306 also includes other non-alphabet keys, such as, an "upper case" key, a "space bar" key, and a "delete" key, among others.

Screen 302 shows an example text-based application (e.g., e-mail, SMS, or the like) that is running on computing device 300. The text-based application allows the user to enter text into various fields, such as a "To" field and a body field. If the user wishes to enter text by entering characters from among keyboard 306, the user may select the key using known techniques, such as by selecting and releasing the appropriate key. For example, to enter an "h" into the application, the user may contact (e.g., by touching or using a stylus pen) the area associated with the "h" key, and release the contact. To enter a sequence of characters, or a word, the user may select the corresponding characters on keyboard 306. For example, to enter the word "HOME," the user may select the keys "H," "O," "M," and "E."

Computing device 300 may display, via the user interface, a sequence of characters corresponding to the one or more characters selected by the user, as shown in text-entry field 304. Computing device 300 may employ a processor to execute an algorithm that generates, based on the sequence of characters, a list of one or more suggestion words that begin with the sequence of characters the user entered. In one example, as the user adds more characters to the sequence of characters, computing device 300 may update the list of suggestion words based on the new sequence of characters that includes the additional characters the user entered. The word generating algorithm may utilize the sequence of characters entered by the user, in addition to alternate sequences of characters, which are based on the sequence of characters entered by the user. The alternate sequence of characters may include alternate characters, where a key on keyboard 306, corresponding to an alternate character is proximately located to a key on keyboard 306 corresponding to the character in the sequence that the alternate character replaces. In other words, if the sequence of characters includes the letter "O," the alternate sequence of characters may include the letters "I," "P," "K," and "L," in place of the letter "O" for example, since those letters correspond to keys proximately located to the "O" key on keyboard 306.

In one example, the sequence of characters that the user enters may include non-letter characters such as, for example, DELETE or SPACE. In this example, the algorithm may utilize an alternate sequence of characters by replacing non-letter characters in the sequence of characters with letter characters associated with keys that are proximate located to the keys corresponding to the non-letter characters.

For example, using the keyboard layout of FIGS. 3A-3D, the key corresponding to DELETE on keyboard 306 is proximately located to the key corresponding to the letter "M." In one example, if a user enters a sequence of letters that includes a DELETE, the algorithm may use one sequence of characters where DELETE is treated as a correct delete and another sequence of characters where DELETE is treated as an intended "M." In other words, if the user enters "H O<DELETE>" (FIG. 3C), the algorithm may generate a list of suggestion words that begin with the sequences: "H O," "J O," "H I," "H O M," "H O L," "J O L," and so forth.

Computing device 300 may display the generated suggestion words on screen 302, where the user may optionally select one of the suggestion words or continue to enter characters. In one example, the user may utilize his/her finger or a device (e.g., stylus pen) to interact with screen 302 to select suggestion words. If the user selects one of the suggestion words, the word is inserted into the text body of the text-based application. If the user continues entering characters without selecting one of the suggestion words, the sequence of characters is displayed as entered by the user.

Figure 3B:
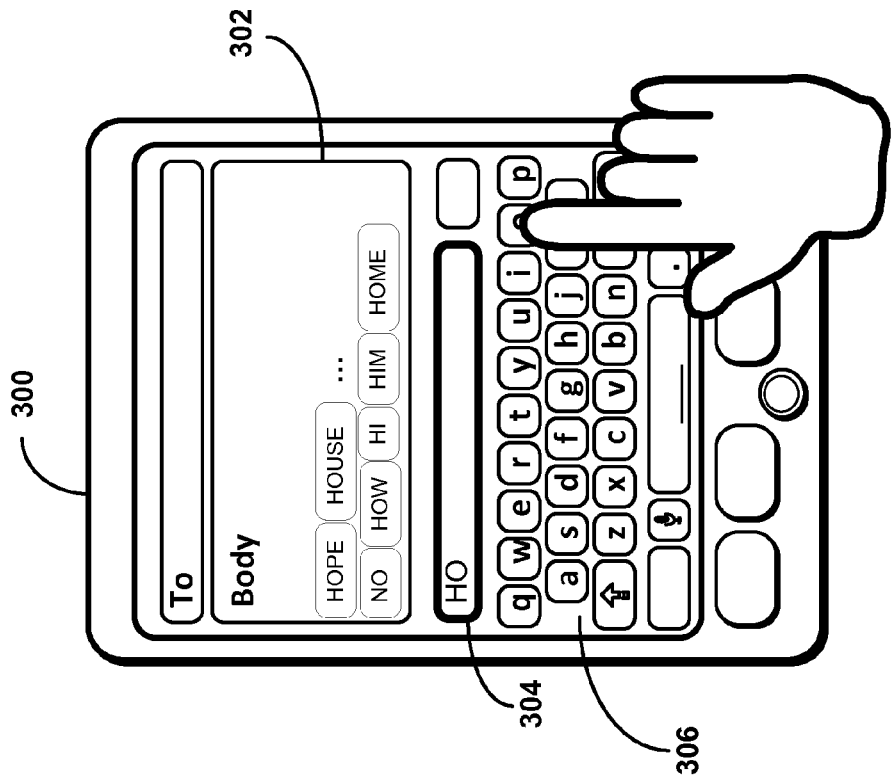
Figure 3A:
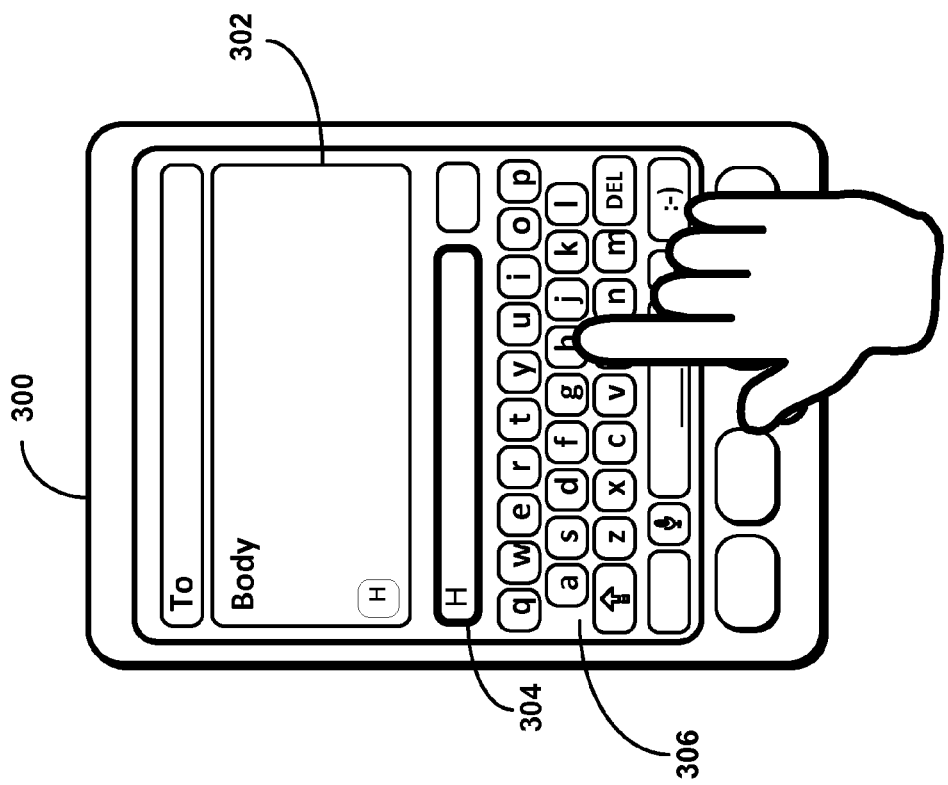

In the example of FIGS. 3A-3D, the user may start entering text to enter, for example, the word "HOME." As shown in FIG. 3A, the user may enter the letter "H" by selecting the corresponding key. At this initial step, the user has entered only one character, and therefore, computing device 300 may not provide any suggestions based on the one character. As the user starts entering more characters, an algorithm that generates suggestion words based on a sequence of characters may generate a list of suggestion words based on the characters entered by the user, and on an alternate sequence of characters that is based on the characters entered by the user. As shown in FIG. 3B, the user may enter the sequence of characters "H O." In response, the algorithm that generates word suggestions may generate the words "HOME," "HOPE," "HOUSE," "HIM," "NOW," and the like. These suggestion words may be based on the sequence of characters "H O" and alternate sequences of characters based on the keys proximately located to the selected keys, in this example, the alternate sequences of characters may be, for example, "H I" and "N O." The generated suggestion words may be displayed on screen 302 for the user to select from, if the user sees the word he/she wishes to enter. The user may select one of the displayed suggestion words for entry into the application that computing device 300 may be running, where at least a portion of the application is text-based.

As the user adds more characters via keyboard 306, the algorithm that generates the suggestion words modifies the sequences of characters used to generate the suggestion words. In the example sequence above, the previous sequence of characters may be "H O," and the user may select DELETE next, and the new sequence of characters may be "H O <DELETE>" as shown in FIG. 3C. The algorithm that generates suggestions words may generate words based on the following sequences of characters: "H O," "J O," "H I," "H O M," "H O L," "J O L," and so forth. Display 302 may display the suggestion words generated based on the sequence of characters entered by the user and the alternate sequences of characters. In this example, the suggestion words may be "HOME," "HOLE," "HIM," "NO," and the like.

The algorithm that determines the alternate sequences of character may utilize a rule-based model to determine the alternate sequences of characters, as discussed above. The rule-based model may utilize a probabilistic model, which may take into account one or more factors (e.g., proximity of one key to a neighboring key, the general probability that a user may erroneously select a key in lieu of a neighboring key, the probability a key is erroneously selected instead of a neighboring key by the specific user, and the like). For example, historical data for the specific user of computing device 300 may indicate a high probability that when the specific user erroneously selects DELETE, there is a higher probability that the intended key is "M" than "L." Therefore, in character sequences where the user selects DELETE, the algorithm may consider the DELETE character an erroneous entry and that the user likely intended to select "M" or "L," but that it is more likely "M" than "L." As s result, when generating suggestion words, the algorithm may generate more words where DELETE is replaced with "M" than words where DELETE is replaced with "L." In this manner, the user may erroneously select characters (alphabetical and non-alphabetical) that are proximately located to characters that the user intended on selecting.

In this example, the user having intended to enter the characters "H O M E," may have inadvertently selected the DELETE key instead of "M," hence entering the sequence "H O<DELETE>." Therefore, instead of "H O M," the display may show "H." Using the techniques of this disclosure, the computer device 300 may operate one or more processors to execute an algorithm that generates suggestions words based on characters entered by the user, including instances when the user deletes a character in the sequence of characters entered. As FIG. 3D illustrates, the user may select the intended word, for example "HOME," from the list of suggestion words that computing device 300 displays on display 302. As a result, the text-entry field 304 gets populated with the selected text, in this example, "HOME."

Figure 4:
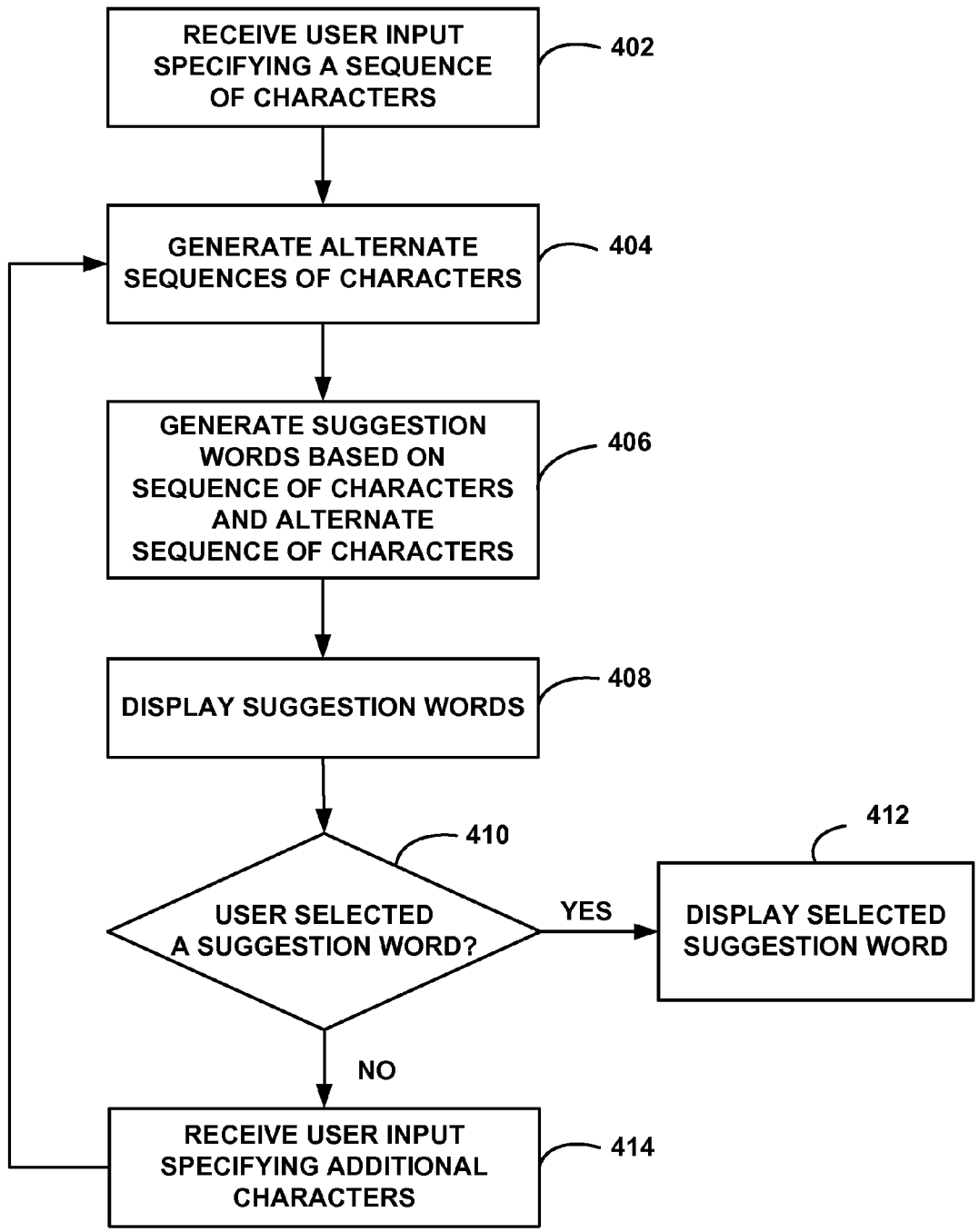
FIG. 4 is a flow diagram illustrating a method that may be performed by a computing device in accordance with one or more techniques of the present disclosure.

FIG. 4 is a flow diagram illustrating a method that may be performed by a computing device in accordance with one or more techniques of the present disclosure. For example, the illustrated example method may be performed by computing device 100 (FIGS. 1 and 2) or computing device 300 (FIGS. 3A-3D). In some examples, a computer-readable storage medium (e.g., a medium included in storage device 128 of FIG. 2) may be encoded with instructions that, when executed, cause one or more processors (e.g., processor 122) to perform one or more of the acts illustrated in the method of FIGS. 1, 2, and 3A-3D.

The method of FIG. 4 includes receiving, via a user interface of a computing device, a sequence of characters corresponding to user input provided via a keyboard of the user interface (e.g., keyboard 106 of FIG. 1 or keyboard 306 of FIGS. 3A-3D) (402), wherein the keyboard includes a DELETE key, and wherein the sequence of characters includes a DELETE character, and generating an alternate sequence of characters from the sequence of characters by replacing characters in the sequence of characters with alternate characters, where each of the alternate characters corresponds to alternate keys proximately located to the keys associated with the characters in the sequence of characters (404). Generating the alternate sequence of characters includes replacing the DELETE character in the sequence of characters with the alternate character that corresponds to the alternate key proximately located to the DELETE key on the keyboard.

The method further includes generating one or more suggestion words beginning with the sequence of characters and the alternate sequence of characters (406). The method also includes displaying, via the user interface (e.g., screen 302 of FIGS. 3A-3D), the one or more suggestion words (408). If the user selects one of the suggestion words (410), the method further includes displaying the selected suggestion word in a text-based application operable by the computing device, into which the user may be entering text (412). If the user does not select one of the suggestion words, and inputs additional characters (414), the method further included generating a new alternate sequence of characters based on the sequence of characters and the additional characters input by the user (404), and one or more new suggestion words may be generated based on the new sequence of alternate characters (406).

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer-readable medium, such as a computer-readable storage medium, containing instructions. Instructions embedded or encoded in a computer-readable medium, including a computer-readable storage medium, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

Various embodiments of the disclosure have been described. These and other embodiments are within the scope of the following claims.

The invention claimed is:

1. A method comprising:
receiving, at a computing device, a sequence of characters corresponding to user input provided via a keyboard of the computing device, wherein the keyboard includes a DELETE key;
receiving, via the keyboard, user input corresponding to a selection of the DELETE key;
generating, by the computing device, a first alternate sequence of characters based on the sequence of characters, the first alternate sequence of characters including each character from the sequence of characters except a character from the sequence of characters indicated by the selection of the DELETE key;
generating, by the computing device, a second alternate sequence of characters based on the sequence of characters, the second alternate sequence of characters including each character from the sequence of characters and an alternate character that corresponds to an alternate key located proximate to the DELETE key on the keyboard;
generating a first group of suggestion words, each suggestion word from the first group of suggestion words beginning with the first alternate sequence of characters;
generating a second group of suggestion words, each suggestion word from the second group of suggestion words beginning with the second alternate sequence of characters;
outputting, at a display of the computing device, at least one of the first group of suggestion words and the second group of suggestion words;
removing at least one of the first group of suggestion words and the second group of suggestion words from the display in response to receiving an additional character corresponding to additional user input received at the keyboard;
generating a third alternate sequence of characters based on the sequence of characters and the additional character, the third alternate sequence of characters including the additional character and each character of at least one of the first alternate sequence of characters and the second alternate sequence of characters; and
generating a third group of suggestion words, each suggestion word of the third group of suggestion words beginning with the third alternate sequence of characters.

2. The method of claim 1, further comprising:
outputting the keyboard at a touch screen of the computing device.

3. The method of claim 1, further comprising:
outputting, at the display of the computing device, the third group of suggestion words and at least one of the first group of suggestion words and the second group of suggestion words.

4. The method of claim 1, further comprising:
selecting, by the computing device, the alternate character, wherein the selection of the alternate character is based at least in part on a probability of an erroneous selection of the DELETE key, the probability being based at least in part on a layout of the keyboard.

5. The method of claim 1, further comprising:
selecting, by the computing device, the alternate character, wherein the selection of the alternate character is based at least in part on a probability of an erroneous selection of the DELETE key, the probability being based at least in part on user-specific historical data.

6. A non-transitory computer-readable storage medium encoded with instructions that, when executed, cause one or more processors to:
receive, at the computing device, a sequence of characters corresponding to user input provided via a keyboard of the computing device, wherein the keyboard includes a DELETE key;
receive, via the user interface, user input corresponding to a selection of the DELETE key;
generate a first alternate sequence of characters based on the sequence of characters, the first alternate sequence of characters including each character from the sequence of characters except a character from the sequence of characters indicated by the selection of the DELETE key;
generate a second alternate sequence of characters based on the sequence of characters, the second alternate sequence of characters including each character from the sequence of characters and an alternate character that corresponds to an alternate key located proximate to the DELETE key on the keyboard;
generate a first group of suggestion words, each suggestion word from the first group of suggestion words beginning with the first alternate sequence of characters; and generate a second group of suggestion words, each suggestion word from the second group of suggestion words beginning with the second alternate sequence of characters;
output, at a display of the computing device, at least one of the first group of suggestion words and the second group of suggestion words;
remove at least one of the suggestion words and the second group of suggestion words from the display in response to receiving an additional characters corresponding to additional user input received at the keyboard;
generate a third alternate sequence of characters based on the sequence of characters and the additional character, the third alternate sequence of characters including the additional character and each character of at least one of the first alternate sequence of characters and the second alternate sequence of characters; and
generate a third group of suggestion words, each suggestion word of the third group of suggestions words beginning with the third alternate sequence of characters.

7. The non-transitory computer-readable storage medium of claim 6, wherein the display of the computing device comprises a touch screen of the computing device.

8. The non-transitory computer-readable storage medium of claim 6, further comprising instructions that cause the one or more processors to output, at the display of the computing device, the third group of suggestion words and at least one of the first group of suggestion words and the second group of suggestion words.

9. The non-transitory computer-readable storage medium of claim 6, further comprising instructions that cause the one or more processors to select the alternate character, wherein the selection of the alternate character is based at least in part on a probability of erroneous keying of the character based on a layout of the keyboard.

10. The non-transitory computer-readable storage medium of claim 6, further comprising instructions that cause the one or more processors to select an alternate character, wherein the selection of the alternate character is based at least in part on a probability of erroneous keying of the character based on user-specific historical data.

11. A computing device, comprising:

one or more processors;

a display device operable by the one or more processors to display a user interface;

a display module operable by the one or more processors to display, at the display device, a keyboard having a DELETE key;

a user interface controller operable by the one or more processors to receive, via the keyboard, an indication of a sequence of characters corresponding to user input provided via the keyboard, and receive, via the keyboard, an indication of a selection of the DELETE key;

an alternate word generator operable by the one or more processors to generate a first alternate sequence of characters based on the sequence of characters, the first alternate sequence of characters including each character from the sequence of characters except a character from the sequence of characters indicated by the selection of the DELETE key, and to generate a second alternate sequence of characters based on the sequence of characters, the second alternate sequence of characters including each character from the sequence of characters and an alternate character that corresponds to an alternate key located proximate to the DELETE key on the keyboard; and a word suggestion generator operable by the one or more processors to generate a first group of suggestion words, each suggestion word from the first group of suggestion words beginning with the first alternate sequence of characters and to generate a second group of suggestion words, each suggestion word from the second group of suggestion words beginning with the second alternate sequence of characters, wherein the display module is further operable by the one or more processors to output, at the display device, at least one of the first group of suggestion words and the second group of suggestion words, and to remove at least one of the first group of suggestion words and the second group of suggestion words from the display in response to receiving an additional character corresponding to additional user input via the keyboard, wherein the alternate word generator is further operable by the one or more processors to generate a third alternate sequence of characters based on the sequence of characters and the additional character, the third alternate sequence of characters including the additional character and each character from at least one of the first alternate sequence of characters and the second alternate sequence of characters, and wherein the word suggestion generator is further operable by the one or more processors to generate a third group of suggestion words, each suggestion word from the third group of suggestion words beginning with the third alternate sequence of characters.

12. The computing device of claim 11, wherein the display device comprises a touch screen of the computing device, and wherein the keyboard displayed at the touch screen.

13. The computing device of claim 11, wherein the display module is further operable by the one or more processors to output, at the display device, the third group of suggestion words and at least one of the first group of suggestion words and the second group of suggestion words.

14. The computing device of claim 11, wherein the alternate word generator is further operable by the one or more processors to select the alternate character based at least in part on a probability of an erroneous selection of the DELETE key, the probability being based on a layout of the keyboard.

15. The computing device of claim 11, wherein the alternate word generator is further operable by the one or more processors to select the alternate character based at least in part on a probability of an erroneous selection of the DELETE key, the probability being based on user-specific historical data.

* * * * *